United States Patent [19]

Imai

[11] Patent Number: 5,301,894
[45] Date of Patent: Apr. 12, 1994

[54] WEBBING RETRACTOR

[75] Inventor: Keisuke Imai, Aichi, Japan

[73] Assignee: Kabushiki Kaisha Tokai-Rika-Denki-Seisakusho, Japan

[21] Appl. No.: 972,917

[22] Filed: Nov. 6, 1992

[30] Foreign Application Priority Data

Nov. 13, 1991 [JP] Japan .................. 3-297344

[51] Int. Cl.$^5$ ............................................. B60R 22/38
[52] U.S. Cl. .................................................. 242/107.4 B
[58] Field of Search ............... 242/107.4 B, 107.4 A; 280/806; 297/478, 480

[56] References Cited

U.S. PATENT DOCUMENTS

| | | | |
|---|---|---|---|
| 4,058,272 | 11/1977 | Takada | 242/107.4 B |
| 4,083,512 | 4/1978 | Rumpf | 242/107.4 B X |
| 4,310,129 | 1/1982 | Morinaga | 242/107.4 B |
| 4,518,131 | 5/1985 | Butenop et al. | 242/107.4 B |
| 4,597,543 | 7/1986 | Mori et al. | 242/107.4 B |
| 4,597,544 | 7/1986 | Fohl | 242/107.4 B |
| 4,905,928 | 3/1990 | Katsuno et al. | 242/107.4 B |

Primary Examiner—John M. Jillions
Attorney, Agent, or Firm—Sixbey, Friedman, Leedom & Ferguson

[57] ABSTRACT

In a webbing retractor, a winding shaft has both ends rotatably supported by a frame and serves to wind-up an occupant securing webbing in a layer fashion. A lock ring is supported relatively rotatably with the winding shaft. The lock ring is usually rotated according to the winding shaft, and operated to block a rotation of the winding shaft in a webbing drawing-out direction when relatively rotated with the winding shaft. An inertial mass body is integrally secured to the lock ring so as to rotate the lock ring relatively with the winding shaft by inertial force when rapidly rotating the winding shaft. A restricting member is provided for the inertial mass body so as to engage the winding shaft, and serves to restrict relative rotation between the winding shaft and the lock ring within a predetermined range.

19 Claims, 2 Drawing Sheets

WEBBING RETRACTOR

BACKGROUND OF THE INVENTION

Field of the Invention

The present invention relates to a webbing retractor which instantaneously stops the rotation of a winding shaft in the webbing drawing-out direction when a vehicle rapidly decelerates. In particular, the invention relates to a webbing winding apparatus including a webbing sensitive inertia reel in which the winding shaft is stopped from rotating by sensing a rapid rotation of the winding shaft in the webbing drawing-out direction.

Background Information

Winding shaft rotation stopping mechanisms used in webbing retractors for vehicles are well-known. For example, one winding shaft rotation stopping mechanism can stop the drawing-out of the webbing by sensing the rapid drawing-out of the webbing, i.e., sensing the rapid rotation of the winding shaft in the webbing drawing-out direction by using an inertial body. Thus, the rotation of the winding shaft in the webbing drawing-out direction can be prevented. Such a mechanism is referred to as WSIR (Webbing Sensitive Inertial Reel).

In this type of webbing retractor, a lock ring is relatively rotatably coupled to the winding shaft at one end of the winding shaft. The lock ring normally rotates with the winding shaft. An internal gear wheel is secured to a frame corresponding to the one end of the winding shaft. A lock plate is arranged between the internal gear wheel and the end of the winding shaft so as to engage the winding shaft and the internal gear wheel. The lock plate is normally held by the lock ring so as to rotate with the lock ring (that is, with the winding shaft). When the lock ring causes relative rotation (rotational delay) with the winding shaft, the lock plate is guided by the lock ring so as to move and engage the winding shaft. A lock gear partially formed on an outer periphery of the lock plate then engages the internal gear wheel. Accordingly, the rotation of the winding shaft in the webbing drawing-out direction is prevented.

Further, a metallic inertial body is integrally secured to the lock ring. Accordingly, when the webbing is rapidly drawn-out, that is, the winding shaft is rapidly rotated in the webbing drawing-out direction, the inertial body causes the lock ring to delay rotation with respect to the winding shaft. Consequently, the lock plate is guided to stop the rotation of the winding shaft in the webbing drawing-out direction.

Some of the webbing winding apparatus are also provided with a preload mechanism (preloader) which immediately takes up slack in the mounted webbing when the vehicle rapidly decelerates. In the preload mechanism, the winding shaft can be rapidly rotated in the webbing wind direction by using pressure generated when a gas generating material is burned, by a spring force or the like. Accordingly, it is possible to reduce the time required for securing the driver by the webbing.

However, in the webbing winding apparatus with the preload mechanism, the winding shaft rapidly rotates in the webbing winding direction immediately after the preload mechanism is operated. Therefore, relative rotation is rapidly generated between the winding shaft and the lock ring so that a high impact load is quickly applied to the lock ring coupled with the winding shaft. Further, even when the operation of the preload mechanism ends and the winding shaft stops, the lock ring (the inertial body) urges the continuation of rotation by inertial force. Consequently, relative rotation rapidly generates between the lock ring and the winding shaft so that the high load is rapidly applied to the lock ring.

Such a high impact load as described above causes damage to the lock ring. Therefore, it is necessary to construct a lock ring so as to resist the impact load, and countermeasures.

In this case, if the mass of the inertial body is simply decreased in order to reduce the impact exerted on the lock ring, a lock gear of the lock plate will engage internal gear wheel in delayed timing. As a result, it is impossible to immediately stop the rotation of the winding shaft in the webbing drawing-out direction.

SUMMARY OF THE INVENTION

In view of the facts set forth above, it is an object of the present invention to provide a webbing retractor which does not require highly enhanced components t prevent damage to components when a vehicle rapidly decelerates. It is another object of the present invention to provide a webbing retractor which can block the drawing-out of a webbing immediately and not in delayed timing.

A webbing retractor of the present invention comprises a frame, a winding shaft having both ends rotatably supported by the frame, for winding-up an occupant securing webbing in a layer fashion, a lock ring supported by the winding shaft so as to be relatively rotatable with respect to the winding shaft, usually serving to rotate according to the winding shaft and serving to block rotation of the winding shaft in the webbing drawing-out direction when rotated relatively with respect to the winding shaft, an inertial mass body integrally secured to the lock ring to rotate the lock ring relatively with respect to the winding shaft by inertial force when the winding shaft rapidly rotates, and a restricting means provided for the inertial mass body so as to engage the winding shaft, for restricting the relative rotation between the winding shaft and the lock ring within a predetermined range.

According to the present invention constructed as set forth above, the winding shaft is usually rotated with the lock ring. Consequently, it is possible to draw-out and wind-up the webbing freely.

When the vehicle rapidly decelerates, the webbing is rapidly drawn-out, that is, the winding shaft is rapidly rotated in the webbing drawing-out direction so that the lock ring to which the inertial mass body is secured causes the relative rotation (rotational delay) with respect to the winding shaft. Thereby, the rotation of the winding shaft in the webbing drawing direction is blocked so as to prevent the webbing from being drawn-out. That is, as an example, the pair of lock plates are held by the lock ring and arranged to engage the winding shaft. The pair of lock plates are guided by the lock ring to engage the internal gear wheel provided for the frame in the relative rotation between the lock ring and the winding shaft. As a result, the pair of lock plates can block the rotation of the winding shaft in the webbing drawing-out direction.

If the winding shaft is rapidly rotated by the preload mechanism in the webbing winding-up direction when the vehicle rapidly decelerates, relative rotation is rapidly generated between the winding shaft and the lock ring. In this case, the inertial mass body is provided with a projection which engages the winding shaft, and the rapid rotational force of the winding shaft in the webbing winding-up direction is exerted on the inertial mass body directly. Therefore, excessive load is not rapidly applied to the lock ring coupled to the winding shaft. Further, at a time when the operation of the preload mechanism ends so as to stop the winding shaft, the lock ring (more specifically, the inertial mass body) continues rotating by inertial force. However, the rotational force of the inertial mass body is directly exerted on the winding shaft through the projection. Consequently, excessive load is not rapidly applied to the lock ring.

Accordingly, a highly enhanced lock ring and the like are not necessary so as to prevent damage to the lock ring due to the excessive impact load. Further, it is not necessary to reduce the mass of the inertial mass body so that the rotation of the winding shaft in the webbing drawing-out direction can be stopped immediate without delayed operational timing of the pair of lock plates described hereinbefore as one example.

DESCRIPTION OF THE PREFERRED EMBODIMENTS

Figure 1:
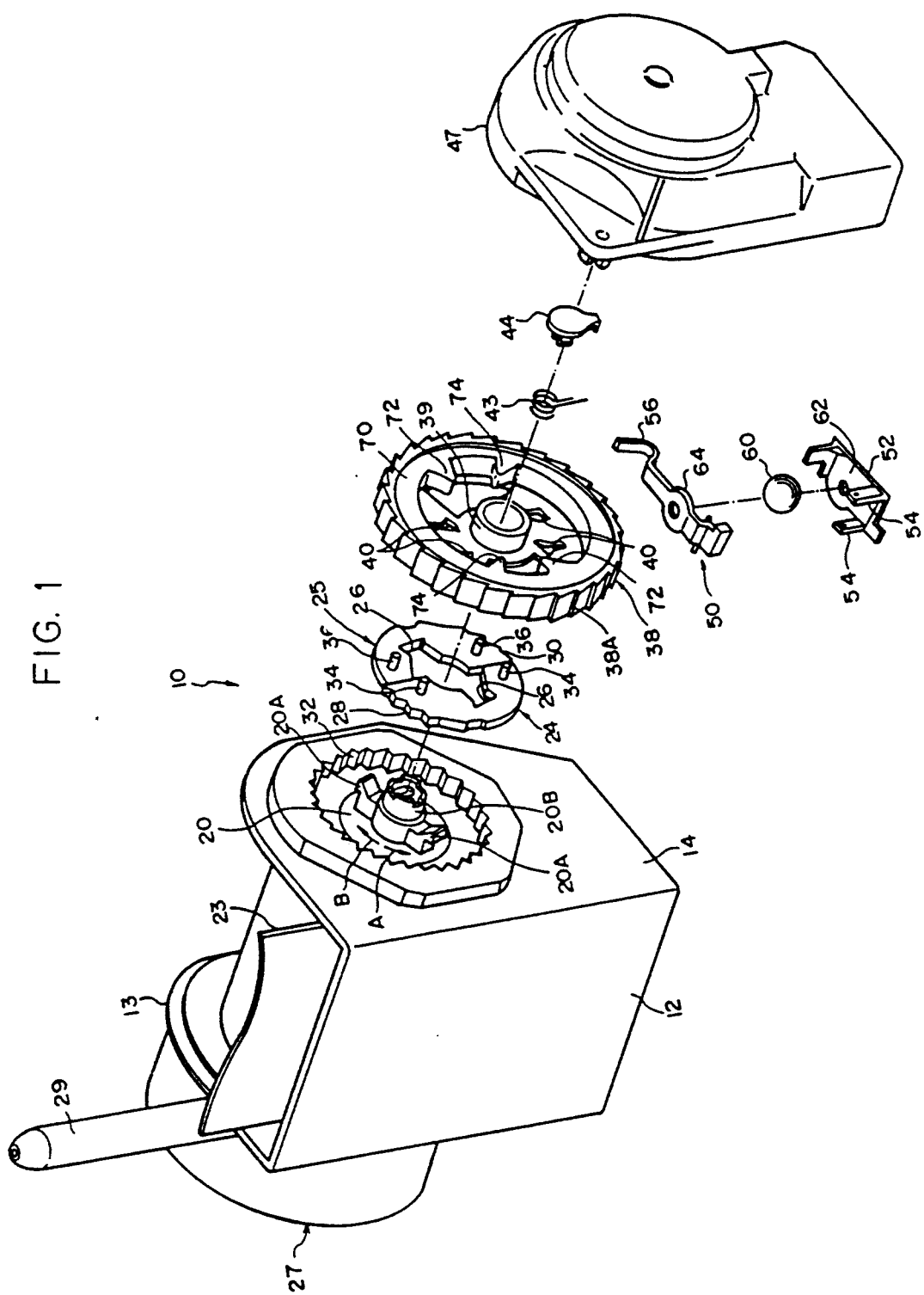
FIG. 1 is an exploded perspective view of an embodiment of a webbing retractor of the present invention.

FIG. 1 shows an exploded perspective view of an embodiment of a webbing retractor 10 of the present invention.

In the webbing retractor 10, a pair of leg portions 13, 14 extend in parallel from both sides of a frame 12. A winding shaft 20 is rotatably supported by the leg portions 13 and 14. One end of a webbing 23, used by an occupant, is attached to the winding shaft 20.

A longitudinal one end of the winding shaft 20 extends from the leg portion 13, and is then connected to a spring complete 27. The spring complete 27 contains an unillustrated power spring. The longitudinal one end of the winding shaft 20 is anchored by the power spring. Accordingly, the winding shaft 20 is urged to rotate in the webbing winding direction (in the direction shown by the arrow marked A in FIG. 1) by the urging force of the power spring. As a result, the webbing 23 can be wound up in layers.

A cylinder 29 forming the preload mechanism is mounted in a vicinity of the spring complete 27. An unillustrated piston contained in the cylinder 29 is coupled to the winding shaft 20 via an unillustrated wire. The cylinder 29 communicates with an unillustrated gas generating portion. Consequently, when the gas generating material is ignited, pressure generated therefrom is transmitted so that the winding shaft 20 is rapidly rotated in the webbing winding direction by the piston and the wire.

The other end of the winding shaft 20 extends from the leg portion 14. The projecting portion of the winding shaft 20 is provided with forked portions 20A. Lock plates 24 and 25 are arranged around the forked portions 20A. The lock plates 24, 25 are provided with substantially U-shaped and notched concave portions 26 at intermediate portions thereof, so as to form substantially C-shaped lock plates. The forked portions 20A are provided within the notched concave portions 26. The notched concave portions 26 have a width dimension slightly larger than a width dimension of the forked portion 20A. Further, the lock plates 24 and 25 can be relatively rotated only by a predetermined angle with respect to the winding shaft 20.

At one of the ends of these lock plates 24 and 25, claw portions 28 and 30 are respectively provided. The claw portions 28 and 30 are arranged to oppose the lock gears of the internal gear wheel 32 which is fixed to the leg portion 14. Further, a pair of pins 34 and 36 respectively extend from the lock plate 24 and 25. The respective pins 34, 36 pass through elongated holes 40 which are provided in a lock ring 38 so that the pointed ends of the pins axially extend therefrom. The lock ring 38 is rotatably supported by a small diameter shaft portion 20B extending from a shaft center portion of the winding shaft 20 so as to be relatively rotatable with respect to the winding shaft 20.

On an outer periphery of the lock ring 38, there are ratchet teeth 38A. A rotor 44 is secured to a distal end of the small diameter shaft portion 20B passing through the lock ring 38 and extending therefrom. As a result, the rotor 44 is always integrally rotated with the winding shaft 20.

Figure 2:
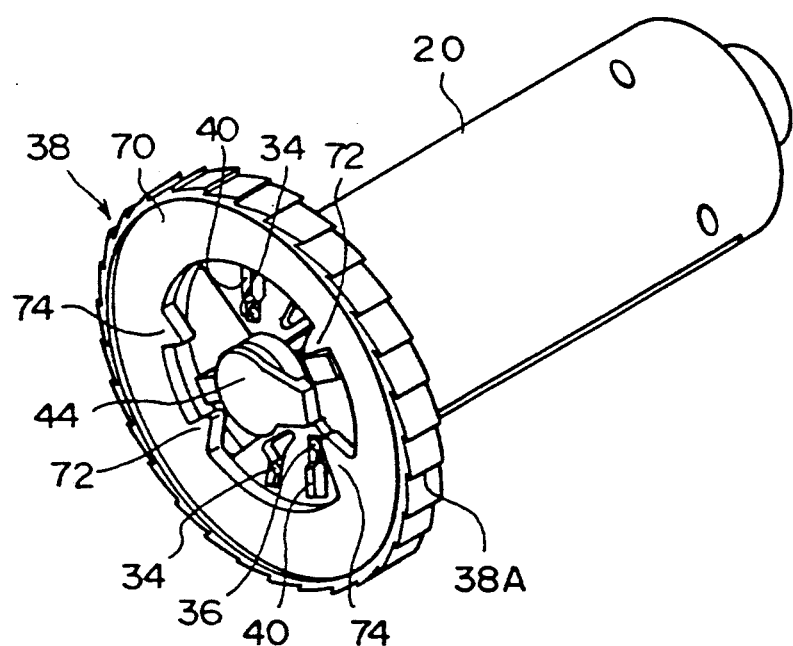
FIG. 2 is a perspective view showing a lock ring and an inertial body in the webbing retractor.

As shown in detail in FIG. 2, an inertial mass body 70 is integrally secured to the lock ring 38 on a surface opposed to a surface contacting the lock plates 24 and 25. The inertial mass body 70 is made of metal, and is provided in the form of ring. A pair of projections 72, 74, i.e., two pairs of projections extend from an inner periphery of the inertial mass body 70. The projections 72, and projections 74 correspond to the forked portion 20A of the winding shaft 20. The forked portion 20A is positioned between the projections 72, and the projections 74. The projections 72 and the projections 74 can engage the forked portion 20A so as to restrict the movement of the forked portion 20A. In other words, the winding shaft 20 and the inertial mass body 70 (that is, the lock ring 38) can be relatively rotated within a range where the forked portion 20A can be moved between the projections 72 and the projections 74. When the forked portion 20A engages the projections 72 and the projections 74, the rotational force of the winding shaft 20 is transmitted to the inertial mass body 70 through the projections 72 and the projections 74.

A helical coil spring 43 is disposed between the rotor 44 and the lock ring 38. A coil portion of the helical coil spring 43 is outwardly fitted in a boss portion 39 of the lock ring 38. One end of the helical coil spring 43 is anchored by the lock ring 38 while the other end is anchored by the rotor 44, respectively. The lock ring 38 is thereby urged and rotated by the urging force of the helical coil spring 43 in the webbing drawing-out direction (in the direction shown by the arrow marked B in FIG. 1). Therefore, the lock ring 38 serves to contain pins 34, 36 of the lock plates 24, 25 in one end of the elongated hole 40 by the urging force of the helical coil spring 43. As a result, the claw portions 28 and 30 are disposed apart from the internal gear wheel 32.

A pawl lever 50 and a ball 60 are disposed immediately below the lock ring 38.

The pawl lever 50 is substantially L-shaped, and is rotatably supported by a pair of arm portions 54. The pair of arm portions 54 extend from one end of a sensor holder 52 which is secured to the outside of a leg plate 14. The one end of the pawl lever 50 extends upwardly, and is bent in a substantially U-shaped form to serve as an engaging portion 56 which can be elastically deformed. The pawl lever 50 can block the rotation of the lock ring 38 by engaging the ratchet teeth 38A of the lock ring 38.

On the other hand, the ball 60 is provided on a conical receiving portion 62 of the sensor holder 52, and can rise in the conical receiving portion 62 when acceleration is exerted. Further, a concave portion 64 of the pawl lever 50 rotatably supported by the arm portion 54 is mounted on the ball 60. When the ball 60 rises in the conical receiving portion 62, the concave portion 64 is pushed upward. Accordingly, the pawl lever 50 is rotated to cause the engaging portion 56 to engage the ratchet teeth 38A.

A cover 47 is arranged outwardly with respect to the lock ring 38, and is secured to the outside of the leg plate 14.

As set forth hereinbefore, the webbing retractor 10 is provided with a construction of a DSIR which is a combination of a so-called Webbing Sensitive Inertia Reel (WSIR) and a so-called Vehicle Sensitive Inertia Reel (VSIR). The WSIR of the webbing retractor can block the rotation of the winding shaft 20 by sensing rapid drawing-out of the webbing 23. The VSIR of the webbing retractor can block the rotation of the winding shaft 20 by sensing that the vehicle is rapidly decelerating. The webbing retractor 10 is also provided with the preload mechanism.

The operation of the embodiment will be described hereinafter.

In the webbing retractor 10 according to the embodiment constructed as set forth above, the frame 12 is mounted to the vehicle via a bolt. In case the wind-up apparatus is used for a three-point type of seat belt apparatus including a Webbing Successive Inertia Reel, the webbing 23 drawn from the winding shaft 20 has an end anchored to the vehicle by an anchoring member, and has an intermediate portion which is folded at a slip joint anchored to the vehicle. Further, a tongue plate is longitudinally and slidably mounted on an intermediate portion between the anchoring member and the slip joint.

In a normal condition, the urging force of the helical coil spring 43 causes the lock ring 38 to accommodate the pins 34 and 36 of the lock plates 24 and 25 in the one ends of the elongated holes 40. The claw portions 28 and 30 are arranged apart from the internal gear wheel 32. Further, the forked portion 20A of the winding shaft 20 contacts one of the projections 72 of the inertial mass body 70. Consequently, the winding shaft 20 is rotated by resisting the urging force of the spring complete 27 (the power spring), and the webbing 23 can be freely drawn-out and wound-up.

When the driver sitting on the seat draws-out the webbing 23 from the winding shaft 20, and the tongue plate engages a buckle apparatus mounted on the vehicle, the driver is in the webbing secured condition.

If the webbing 23 drawn-out as described before is secured to the driver, the winding shaft 20 can be rapidly rotated in the webbing wind-up direction by the preload mechanism such as cylinder 29 when the vehicle rapidly decelerates. At the time, since the forked portion 20A of the winding shaft 20 contacts one of the projections 72 of the inertial mass body 70, the rotational force of the winding shaft 20 is transmitted through the projections 72 to the inertial mass body 70. Accordingly, the inertial mass body 70 and the lock ring 38 are rotated with the winding shaft 20 in the webbing wind-up direction. As a result, slack can be eliminated from the webbing 23 thereby securing the webbing 23 to the driver more snugly.

In this case, the rapid rotational force of the winding shaft 20 in the webbing winding direction is directly exerted on the inertial mass body 70 through the projections 72. A rapid high load is not applied to the lock ring 38 coupled with the winding shaft 20. Therefore, the lock ring 38 is not damaged by an excessive impact load.

When the operation of the preload mechanism ends, the lock ring 38 continues to rotate due to the inertial force of the inertial mass body 70. Consequently, relative rotation is generated between the lock ring 38 and the winding shaft 20. The other projection 74 of the inertial mass body 70 then engages the forked portion 20A of the winding shaft 20. Hence, the rotational force of the inertial mass body 70 is directly exerted on the winding shaft 20 through the projections 74 so that a high load is not rapidly applied to the lock ring 38. As a result, it is possible to avoid damage to the lock ring 38 due to the excessive load impact.

On the other hand, when the vehicle rapidly decelerates, the ball 60 rises in the conical receiving portion 62 of the sensor holder 52 at substantially the same time as the operation of the preload mechanism as set forth above. Hence, the concave portion 64 of the pawl lever 50 is pushed upward so as to rotate the pawl lever 50. The engaging portion 56 of the pawl lever 50 engages the ratchet teeth 38A of the lock ring 38 so as to block the rotation of the lock ring 38.

Therefore, relative rotation (the rotational delay) is generated between the lock ring 38 and the winding shaft 20. The lock plates 24 and 25 are rotated with the winding shaft 20 by this relative rotation. The pins 34 and 36 of the lock plates 24 and 25 are guided by the elongated holes 40 of the lock ring 38 so that the claw portions 28 and 30 engage the internal gear wheel 32. Accordingly, it is possible to block the rotation of the winding shaft 20 in the webbing drawing-out direction. As a result, the driver can be securely held by the webbing 23.

Furthermore, the rotational delay of the lock ring 38 is generated due to the inertial mass body 70 according to the movement of the ball 60 when the vehicle rapidly decelerates. That is, if the webbing 23 is rapidly drawn-out and the winding shaft 20 is rapidly rotated in the webbing drawing-out direction due to the driver moving forward in the vehicle, the lock ring 38 to which the inertial mass body 70 is secured causes relative rotation (the rotational delay) with respect to the winding shaft 20. Hence, the pins 34, 36 of the lock plates 24, 25 are guided by the elongated holes 40 as in the case set forth above, and the claw portions 28 and 30 engage the internal gear wheel 32. Therefore, it is possible to block the rotation of the winding shaft 20 in the webbing drawing direction. As a result, the drawing-out of the webbing 23 can be blocked, and the driver can be securely held by the webbing 23.

As set forth hereinbefore, in the webbing retractor 10, the inertial mass body 70 is provided with a pair of projections 72, and a pair of projections 74 which can engage the forked portion 20A of the winding shaft 20. The force of the relative rotation generated between the winding shaft 20 and the lock ring 38 is mutually transmitted between the winding shaft 20 and the lock ring 38 through the projections 72, and the projections 74. Therefore, the lock ring 38 is not damaged due to an excessive impact load. Also, since it is not necessary to reduce the mass of the inertial mass body 70, the lock plates 24, 25 can engage the internal gear wheel 32 not in delayed timing but in appropriate timing. Further, the rotation of the winding shaft 20 in the webbing drawing-out direction can be stopped immediately.

The webbing retractor 10 of the embodiment is provided with a construction of a DSIR-type which is a combination of a so-called Webbing Sensitive Inertia Reel (WSIR) and a so-called Vehicle Sensitive Inertia Reel (VSIR). The WSIR of the webbing retractor can block the rotation of the winding shaft 20 by sensing the rapid drawing-out of the webbing 23. The VSIR-type of webbing retractor can block the rotation of the winding shaft 20 by sensing the condition that the vehicle is rapidly decelerating. However, it must be noted that the present invention should not be limited to this, and may employ a webbing retractor simply having a construction of the Webbing Sensitive Inertia Reel. Similarly, even in this case, the force of the relative rotation generated due to the rapid drawing of the webbing between the winding shaft 20 and the lock ring 38 can be mutually transmitted between the winding shaft 20 and the lock ring 38 through the projections 72 and the projections 74. Therefore, the lock ring 38 is not damaged by an excessive impact load. The lock plates 24, 25 can be operated not in delayed timing but in appropriate timing, and it is possible to stop the rotation of the winding shaft 20 in the webbing drawing-out direction immediately.

What is claimed is:

1. A webbing retractor comprising:
   a frame;
   a winding shaft having both ends rotatably supported by said frame for winding-up a webbing in a layer fashion, said winding shaft including forked portions extending in a direction substantially perpendicular to an axial direction of said winding shaft;
   a lock ring supported by said winding shaft and relatively rotatable with respect to said winding shaft, usually rotating according to said winding shaft and serving to stop a rotation of said winding shaft in a webbing drawing-out direction when rotated relatively with respect to said winding shaft;
   an inertial mass body integrally secured to said lock ring to rotate said lock ring relatively with respect to said winding shaft by inertial force when said winding shaft is rapidly rotated; and
   a restricting means provided for said inertial mass body which is engagable with said winding shaft for restricting the relative rotation between said winding shaft and the lock ring within a predetermined range wherein said restricting means comprises two pairs of projections which are engagable with said forked portions of said winding shaft.

2. A webbing retractor according to claim 1, wherein said inertial mass body has a ring-shaped form.

3. A webbing retractor according to claim 2, wherein said restricting means is provided on an inner periphery of said inertial mass body.

4. A webbing retractor according to claim 3, wherein said two pairs of projections are provided symmetrically with respect to an axis of said inertial mass body.

5. A webbing retractor according to claim 4, wherein said projections have a triangular section in the direction perpendicular to said axial direction of said inertial mass body.

6. A webbing retractor according to claim 1, wherein said inertial mass body is made of metal.

7. A webbing retractor according to claim 1 further comprising:
   a pair of lock plates arranged to be held by said lock ring and to engage said winding shaft, and provided in the form of a circular arc so as to a block a rotation of said winding shaft in a webbing drawing-out direction when said lock ring and said winding shaft are relatively rotated.

8. A webbing retractor according to claim 7, wherein said frame has an internal gear member, and said internal gear member engaging said pair of lock plates to block the rotation of said winding shaft in the webbing drawing-out direction when said winding shaft and said lock ring are relatively rotated.

9. A webbing retractor according to claim 8, wherein said pair of lock plates respectively have a plurality of pin members, said pin members passing through elongated holes corresponding to said pin members, which are provided in said lock ring, and being guided by said elongated holes to move within said elongated holes for engaging said internal gear member with said pair of lock plates when said winding shaft and said lock ring are relatively rotated.

10. A webbing retractor according to claim 1, wherein said inertial mass body provided at a position further toward an outer side, in an axial direction of said winding shaft, than at least a portion of said lock ring.

11. A webbing retractor according to claim 1 further comprising:
   a preload mechanism for rapidly rotating said winding shaft in the webbing wind-up direction when a vehicle rapidly decelerates.

12. A webbing retractor according to claim 1 further comprising:
   a sensor means for blocking a rotation of said lock ring in a webbing drawing-out direction when a vehicle rapidly decelerates.

13. A webbing retractor comprising:
   a frame having a substantially rectangular cross-sectional configuration;
   a winding shaft having both ends rotatably supported by said frame for winding-up webbing in a layer fashion, said winding shaft including forked portions extending in a direction substantially perpendicular to an axial direction of said winding shaft;
   an internal gear wheel secured to a portion of said frame rotatably supporting one end of said winding shaft;
   a pair of lock plates arranged to be engagable with said winding shaft, and moving to engage said internal gear wheel, and being provided in a circular arc form so as to stop a rotation of said winding shaft in a webbing drawing-out direction;
   a lock ring supported relatively rotatably to said winding shaft, usually rotating according to said winding shaft and holding said pair of lock plates so as not to engage said winding shaft, and moving said pair of lock plates so as to engage said pair of lock plates with said internal gear wheel when relatively rotated with said winding shaft;
   a ring-shaped inertial mass body integrally secured to said lock ring at a position further toward an outer side in an axial direction of said winding shaft than at least a portion of said lock ring in order to rotate said lock ring relatively with respect to said winding shaft by inertial force when said winding shaft is rapidly rotated; and two pairs of projections provided on an inner periphery of said inertial mass body which are engagable with said forked portions of said winding shaft and which serve to restrict relative rotation between said winding shaft and said lock ring within a predetermined range.

14. A webbing retractor according to claim 13, wherein said inertial mass body is made of metal.

15. A webbing retractor according to claim 14, wherein said two pairs of projections are symmetrically provided with respect to an axis of said inertial mass body.

16. A webbing retractor according to claim 13, wherein said projections have a triangular section in the direction perpendicular to the axial direction of said inertial mass body.

17. A webbing retractor according to claim 13 further comprising:

a preload mechanism for rapidly rotating said winding shaft in the webbing wind-up direction when a vehicle rapidly decelerates.

18. A webbing retractor according to claim 13 further comprising:

an acceleration sensor means for blocking a rotation of said lock ring in a webbing drawing-out direction when a vehicle rapidly decelerates.

19. A webbing retractor according to claim 13, wherein said pair of lock plates respectively have a plurality of pins, said plurality of pins passing through elongated holes corresponding to said pins, which are provided in said lock ring, and being guided by said elongated holes to move within said elongated holes for engaging said internal gear member with said pair of lock plates when said winding shaft and said lock ring are relatively rotated.

* * * * *